3,211,772
PHOSPHONYL - (THIONO) PHOSPHONIC ( - PHOSPHINIC) ACID ESTERS AND PROCESS FOR THE PRODUCTION THEREOF
Gerhard Schrader, Wuppertal-Cronenberg, and Walter Lorenz, Wuppertal-Vohwinkel, Germany, assignors to Farbenfabriken Bayer Aktiengesellschaft, Leverkusen, Germany, a German corporation
No Drawing. Filed May 14, 1962, Ser. No. 194,732
Claims priority, application Germany, May 19, 1961, 33,962
10 Claims. (Cl. 260—461)

The present invention relates to and has as its objects new and useful phosphorus containing compounds and a method for the production thereof. More specifically this invention relates to α-dialkylphosphonyl-β,β,β-trichloroethyl-(thiono)phosphonic(-phosphinic) acid esters of the general formula

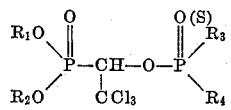

in which $R_1$ and $R_2$ stand for lower alkyl radicals, while $R_3$ and $R_4$ denote saturated or unsaturated optionally substituted aliphatic, cycloaliphatic, araliphatic or aromatic radicals and $R_4$ moreover may be an optionally substituted alkoxy- or cycloalkoxy-, as well as a further

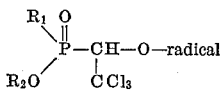

wherein $R_1$ and $R_2$ have the same meaning as indicated above.

It has been found that compounds of the above mentioned general formula can be obtained easily and with good yields by the reaction of β,β,β-trichloro-α-hydroxyethylphosphonic acid-O,O-dialkylesters with the corresponding (thiono)-phosphonic(-inic) acid halides.

The process according to the invention is illustrated by the following scheme of reaction:

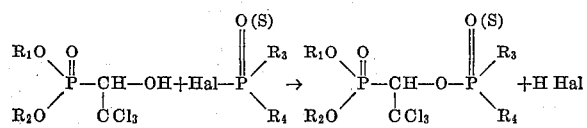

In the aforesaid equation the radicals $R_1$ to $R_4$ have the same significance as given above, while Hal stands for a halogen atom.

The reaction according to the process described is preferably carried out in the presence of acid-binding agents. As such, tertiary bases such as triethylamine, dimethylaniline or pyridine are primarily to be considered.

Furthermore, it has proved expedient to carry out the reaction in an inert organic solvent or a mixture of solvents and at slightly elevated temperatures as well as to stir the reaction mixture, after combination of the starting components for a prolonged time. A mixture of anhydrous ether and benzene has proved especially suitable as a solvent.

Some of the inventive α-dialkylphosphonyl-β,β,β-trichloroethyl-(thiono)-phosphonic-(-inic)acid esters are well crystallised substances with a distinct melting point. They can easily be further purified by recrystallising from the usual solvents or mixtures of solvents, but others are water-soluble or -insoluble oils distillable under a high vacuum without decomposition.

The inventive products are distinguished by outstanding insecticidal properties and are therefore intended to be employed as pest control agents, especially for plant protection.

The new compounds of the present invention very effectively kill insects like flies, mites, aphids, etc. They distinguish themselves especially by a good contact-insecticidal activity and mostly also by a systemic action. At the same time they have an activity on eating insects such as caterpillars. Most surprisingly they are of remarkably low toxicity against mammals. They may be used in the same manner as other known phosphoric insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As examples for the special utility the inventive compounds of the following formulae

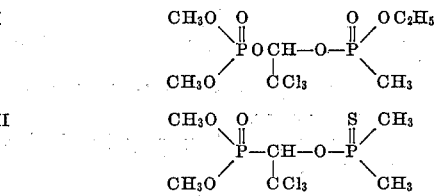

have been tested against flies, caterpillars and aphids. Aqueous dilutions of these compounds have been prepared by mixing the active ingredients with the same amounts of dimethyl formamide as an auxiliary solvent adding thereto 20% by weight referred to active ingredient of a commercial emulsifier consisting of a benzyl hydroxy polyglycol ether containing about 10 to 15 glycol ethers, and diluting this premixture at last with water to the desired concentration indicated in the following paragraphs.

The tests have been carried out as follows:

(a) Against flies: about 50 flies (*Musca domestica*) are placed under covered petri dishes in which drip wet filter papers have been placed which are sprayed with insecticidal solutions of concentrations as shown below. The living status of the flies has been determined after 24 hours. The following results have been obtained:

| Compound aqueous concentration (in percent active ingredient/water): | Killing rate (in percent) |
|---|---|
| (I) 0.01 | 100 |
| (II) 0.1 | 100 |

(b) Against caterpillars of the type diamond black moth (*Plutella maculipennis*): white cabbage has been sprayed drip wet with aqueous emulsions as prepared above in a concentration as shown below. Caterpillars (10 each) have been placed on the sprayed leaves of the white cabbage. The living status of the caterpillars has been determined after 24 hours and 48 hours. The following results have been obtained:

| Compound aqueous concentration (in percent active ingredient/water): | Killing rate (in percent) |
|---|---|
| (I) 0.01 | 100 |
| (II) 0.01 | 100 |

(c) Against aphids (species *Doralis fabae*). Heavily infested bean plants (*Vitia faba*) have been sprayed drip wet with solutions as prepared above in a concentration as shown below. The effect has been determined by evaluation after 24 hours by counting the dead pests either on the surface of the soil or still remaining on the plants. The following results have been obtained:

Complete killing has been obtained with 0.001% solutions in the first case and with a solution of 0.01% in the second case.

The following examples may give a survey of the invention as claimed without limiting it in any way:

Example 1

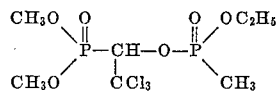

65 g. (0.25 mol) of β,β,β-trichloro-α-hydroxyethylphosphonic acid-O, O-dimethyl ester are dissolved in a mixture of 700 cc. of anhydrous ether and 200 cc. of benzene, 37 g. (0.25 mol) of methyl-phosphonic acid-O-ethyl ester chloride are added with stirring to the solution obtained, 30 g. (0.25 mol) of triethylamine are subsequently added dropwise to the reaction mixture at about 30° C., the latter is thereafter stirred for another 12 hours and the precipitated triethyl ammonium hydrochloride is then filtered off with suction. Subsequently, the solvent is evaporated from the filtrate under vacuum and the residue is rectified. 83 g. (91% of the theoretical yield) of the ester of the above formula are obtained as a water-soluble oil which comes over under a pressure of 0.05 mm. Hg at 132 to 133° C. The mean toxicity ($DL_{50}$) of the compound on rats per os amounts to 5 mg. per kg. of animal.

Caterpillars, flies and aphids are completely destroyed by 0.01% solutions of the ester.

By exactly the same method there may be obtained the following compounds:

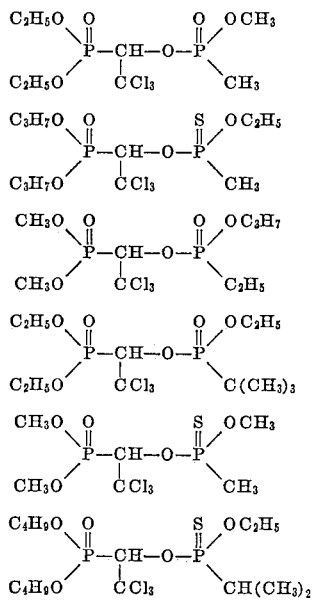

Example 2

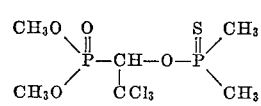

To a solution of 65 g. (0.25 mol) of β,β,β-trichloro-α-hydroxyethylphosphonic acid-O,O-dimethyl ester in 700 cc. of anhydrous ether and 200 cc. of benzene there are added at 30° C. 34 g. (0.25 mol) of dimethylthionophosphinic acid chloride, 30 g. of triethylamine are subsequently added dropwise and the mixture is stirred for another 12 hours at room temperature. The precipitated triethyl ammonium hydrochloride is then filtered off with suction. After distilling off the solvent from the filtrate the residue solidifies in crystalline form. It is recrystallized from a mixture of acetic acid ethyl ester and petroleum ether and shows thereafter a melting point of 106° C.

Yield: 52 g. (59% of the theoretical amount). The compound shows a mean toxicity on rats per os of 5 mg. per kg. of animal.

Caterpillars, flies and aphids are completely destroyed by 0.01% solutions of the ester.

In the same way there may be produced the following compounds

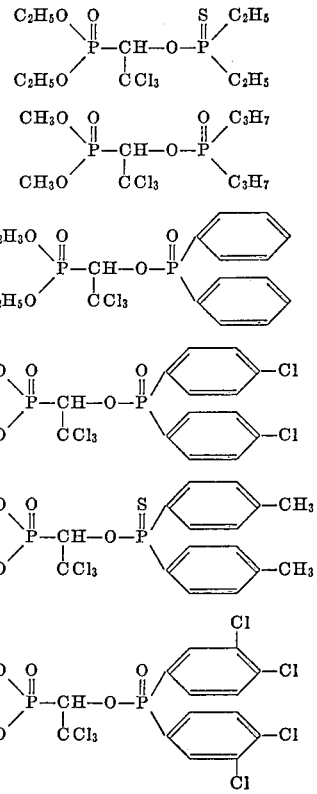

Example 3

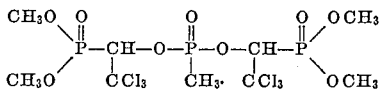

A solution of 130 g. (0.5 mol) of β,β,β-trichloro-α-hydroxyethylphosphonic acid-O,O-dimethyl ester in 1000 cc. of anhydrous ether and 300 c. of benzene is treated, whilst stirring, with 34 g. of methylphosphonic acid dichloride, 30 g. of triethylamine are subsequently added dropwise to the reaction mixture and the latter is then stirred for another 12 to 14 hours at room temperature. The triethyl ammonium hydrochloride is thereafter filtered off with suction and the volatile part of the filtrate is evaporated under vacuum. As residue, 100 g. (70% of the theoretical yield) of the ester of the above constitution are obtained in form of a somewhat water-soluble colourless oil.

*Analysis.*—Calculated for molecular weight 575: Cl, 18.5%; P, 2%. Found: Cl, 17.9%; P, 16.0%. Mean toxicity of the compound ($DL_{50}$): 170 mg. per kg. of rat on oral application. Caterpillars are completely destroyed by 0.01% solutions of the ester and flies are killed to 100% even by 0.001% solutions.

In the same manner there bay be produced the following compounds:

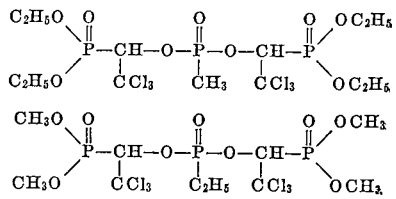

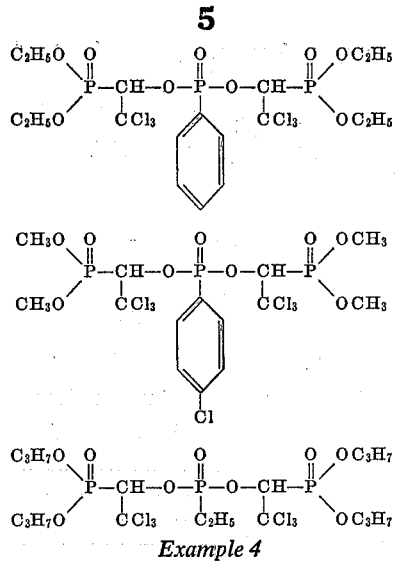

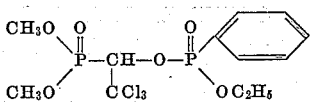

*Example 4*

65 g. (0.25 mol) of β,β,β-trichloro-α-hydroxyethyl phosphonic acid-O,O-dimethyl ester are dissolved in a mixture of 700 cc. of anhydrous ether and 200 cc. of benzene, 54 g. (0.25 mol) of phenylphosphonic acid-O-ethyl ester chloride are first added dropwise, whilst stirring, at 30° C., thereafter 30 g. of triethylamine are added to the reaction mixture and the latter is finally stirred for 10 to 12 hours at room temperature. The precipitated triethyl ammonium hydrochloride is then filtered off with suction. The solvent is evaporated from the filtrate under vacuum and 70 g. (66% of the theoretical yield) of the above ester are obtained as residue in form of a water-insoluble colourless oil.

*Analysis.*—Calculated for molecular weight 426: Cl, 25.0%; P, 14.6%. Found: Cl, 24.8%; P, 15.0%.

The mean toxicity ($DL_{50}$) of the preparation on rats per os amounts to 7 mg. per kg. of animal.

Caterpillars are completely destroyed by 0.01% solutions and flies even by 0.001% solutions of the ester.

By exactly the same method there may be obtained the following compounds:

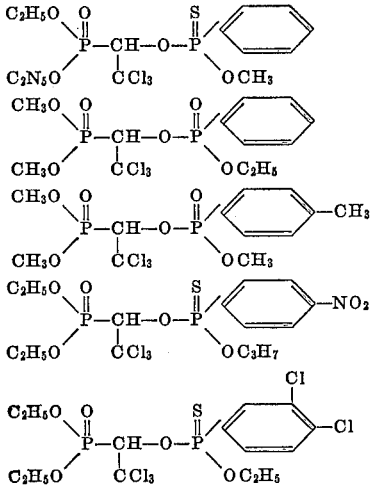

*Example 5*

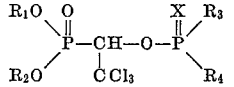

65 g. (0.35 mol) of β,β,β-trichloro-α-hydroxyethyl-phosphonic acid-O,O-dimethyl ester are dissolved in a mixture of 700 c. of anhydrous ether and 200 cc. of benzene. 38 g. (0.25 mol) of methyl-thionophosphonic acid-O-methyl ester chloride are added with stirring at 30° C. to the solution obtained, subsequently 30 g. of triethylamine are added dropwise to the reaction mixture, the latter is stirred for 12 hours at room temperature and the triethyl ammonium hydrochloride formed is then filtered off with suction. The solvents are finally evaporated from the filtrate under vacuum. 67 g. (73% of the theoretical yield) of the ester of the above constitution are obtained as residue in form of a colorless water-soluble oil.

*Analysis.*—Calculated for molecular weight 366: Cl, 29.1%, S, 8.8%, P, 16.9%. Found: Cl, 28.9%, S, 8.9%, P, 17.8%.

The mean toxicity ($DL_{50}$) of the compound on oral application amounts to 175 mg. per kg. of rat.

Caterpillars and spider mites are completely destroyed by 0.01% solutions of the ester, flies even by 0.001% solutions. The compound moreover shows an ovicidal activity against the eggs of spider mites.

In the same way there may be prepared the following compounds:

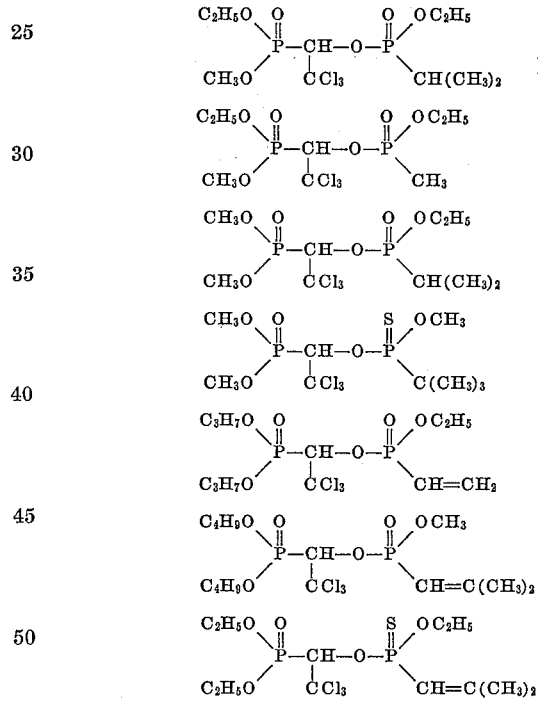

What we claim is:

1. A compound of the formula

in which $R_1$ and $R_2$ each stand for lower alkyl having up to 4 carbon atoms and $R_3$ stands for a member selected from the group consisting of lower alkyl having up to 4 carbon atoms, lower alkenyl having up to 8 carbon atoms, phenyl, chloro-substituted phenyl, nitro-substituted phenyl and lower alkyl-substituted phenyl, lower alkyl having up to 4 carbon atoms and $$\begin{array}{c} R_1O \quad O \\ \diagdown \parallel \\ P-CH-O- \\ \diagup \quad | \\ R_2O \quad CCl_3 \end{array}$$

while $R_4$ stands for a member selected from the group consisting of lower alkyl and lower alkoxy, lower alkyl and lower alkoxy having up to 4 carbon atoms, phenyl, chloro-substituted phenyl, nitro-substituted phenyl and lower alkyl-substituted phenyl, lower alkyl having up to 4 carbon atoms and X stands for a member selected from the group consisting of oxygen and sulfur.

2. The compound of the following formula

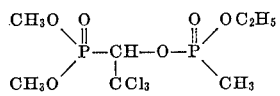

3. The compound of the following formula

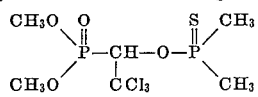

4. The compound of the following formula

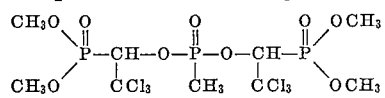

5. The compound of the following formula

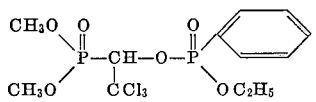

6. The compound of the following formula

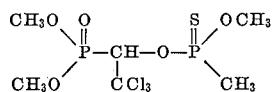

7. The compound according to claim 1 wherein $R_3$ stands for lower alkyl and $R_4$ stands for lower alkoxy.

8. The compound according to claim 1 wherein $R_3$ and $R_4$ stand for lower alkyl.

9. The compound according to claim 1 wherein $R_3$ stands for

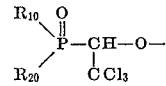

and $R_4$ stands for lower alkyl.

10. The compound according to claim 1 wherein $R_3$ stands for phenyl and $R_4$ stands for alkoxy.

References Cited by the Examiner

UNITED STATES PATENTS

| | | | |
|---|---|---|---|
| 2,909,559 | 10/59 | Lanham | 260—461 |
| 3,014,954 | 12/61 | Birum | 260—461 |
| 3,014,956 | 12/61 | Birum | 260—461 |
| 3,020,306 | 2/62 | Birum | 260—461 |

OTHER REFERENCES

Alimov et al.: "Bull. Acad. Sci. U.S.S.R., Div. Chem. Sci.," 1955, pp. 761–767.

Nikonorov et al.: "Chem. Abst.," vol. 52, col. 240 (1958).

CHARLES B. PARKER, *Primary Examiner.*

MORRIS LIEBMAN, *Examiner.*